(12) United States Patent
van Vooren et al.

(10) Patent No.: US 9,894,834 B2
(45) Date of Patent: Feb. 20, 2018

(54) HEADER FOR A HARVESTING MACHINE INCLUDING A DISPLACEABLE CUTTERBAR TABLE

(71) Applicant: CNH Industrial America LLC, New Holland, PA (US)

(72) Inventors: Sandor van Vooren, Sijsele-Damme (BE); Yvan C. C. Vandergucht, Lo-Reninge (BE); Tim Passchyn, Sint-Michiels (BE)

(73) Assignee: CNH Industrial America LLC, New Holland, PA (US)

( * ) Notice: Subject to any disclaimer, the term of this patent is extended or adjusted under 35 U.S.C. 154(b) by 44 days.

(21) Appl. No.: 15/064,267

(22) Filed: Mar. 8, 2016

(65) Prior Publication Data

US 2016/0262308 A1   Sep. 15, 2016

(30) Foreign Application Priority Data

Mar. 9, 2015 (BE) .................................. 2015/5125

(51) Int. Cl.
*A01D 41/14* (2006.01)
*A01D 41/127* (2006.01)
(Continued)

(52) U.S. Cl.
CPC ......... *A01D 41/127* (2013.01); *A01D 34/006* (2013.01); *A01D 34/14* (2013.01);
(Continued)

(58) Field of Classification Search
CPC .... A01D 41/148; A01D 41/142; A01D 41/14; A01D 34/008
(Continued)

(56) References Cited

U.S. PATENT DOCUMENTS 4,011,709 A   3/1977   Mott et al.
4,177,626 A * 12/1979   McNaught ........... A01D 61/008
                                                            198/513
(Continued)

FOREIGN PATENT DOCUMENTS

AT   396860 B    12/1993
DE   3407812 A1  10/1984
(Continued)

*Primary Examiner* — Arpad Fabian-Kovacs
(74) *Attorney, Agent, or Firm* — Peter K. Zacharias; Patrick M. Sheldrake

(57) ABSTRACT

A header has a cutterbar table that is movably mounted to a frame and configured to cut a standing crop, an intake auger mounted to the frame and configured to receive the cut crop; the intake auger further being configured to rotate, during a normal state, in a predetermined direction, and to rotate, during a corrective state, in a predetermined reversed direction, an actuator assembly configured to displace the cutterbar table relative to the frame, thereby changing a distance between the cutterbar table and the intake auger, a control unit configured to, upon receipt of an error signal indicative of a need to operate in the corrective state control the actuator assembly to displace the cutterbar table away from the intake auger to a safe operating position, prior to controlling the intake auger to rotate in the predetermined reversed direction.

9 Claims, 5 Drawing Sheets

(51) Int. Cl.
*A01D 46/08* (2006.01)
*A01D 75/18* (2006.01)
*A01D 34/00* (2006.01)
*A01D 34/14* (2006.01)
*A01D 34/28* (2006.01)
*A01D 61/00* (2006.01)
*A01D 45/00* (2018.01)
*A01D 101/00* (2006.01)

(52) U.S. Cl.
CPC ......... *A01D 34/286* (2013.01); *A01D 41/148* (2013.01); *A01D 61/004* (2013.01); *A01D 75/187* (2013.01); *A01D 45/00* (2013.01); *A01D 2101/00* (2013.01)

(58) Field of Classification Search
USPC .................................................. 56/208, 11.2
See application file for complete search history.

(56) References Cited

U.S. PATENT DOCUMENTS

| | | | | |
|---|---|---|---|---|
| 4,218,864 | A * | 8/1980 | Allemeersch | A01D 41/142 56/11.2 |
| 4,444,000 | A * | 4/1984 | Enzmann | A01D 41/16 56/14.6 |
| 4,512,139 | A * | 4/1985 | Musser | A01D 41/142 56/11.2 |
| 4,800,711 | A | 1/1989 | Hurlburt et al. | |
| 5,261,216 | A | 11/1993 | Schumacher et al. | |
| 5,527,218 | A * | 6/1996 | Van den Bossche | A01D 41/142 460/116 |
| 5,711,140 | A | 1/1998 | Buermann | |
| 5,778,644 | A * | 7/1998 | Keller | A01D 41/142 56/11.2 |
| 6,167,686 | B1 | 1/2001 | Becker et al. | |
| 6,651,412 | B1 | 11/2003 | Sierk et al. | |
| 7,082,742 | B2 | 8/2006 | Schrattenecker | |
| 7,168,555 | B2 * | 1/2007 | Peterson | B65G 43/00 198/588 |
| 7,380,392 | B2 * | 6/2008 | Willem | A01D 41/14 56/314 |
| 7,730,702 | B2 | 6/2010 | Mortier et al. | |
| 7,766,158 | B2 * | 8/2010 | Laganiere | A01D 57/20 198/312 |
| 7,971,418 | B2 | 7/2011 | Conrad et al. | |
| 7,992,374 | B1 | 8/2011 | Bich et al. | |
| 8,122,696 | B2 | 2/2012 | Moutton et al. | |
| 8,186,136 | B2 | 5/2012 | Eick et al. | |
| 8,241,098 | B1 * | 8/2012 | Latimer | A01D 41/1217 198/313 |
| 2004/0093841 | A1 * | 5/2004 | Clauss | A01D 41/127 56/16.4 R |
| 2005/0022491 | A1 * | 2/2005 | Zurn | A01D 57/20 56/16.4 R |
| 2005/0183932 | A1 * | 8/2005 | Angleitner | B65G 23/44 198/618 |
| 2006/0042217 | A1 | 3/2006 | Buermann | |
| 2006/0089219 | A1 * | 4/2006 | Maertens | A01D 41/142 474/87 |
| 2007/0119136 | A1 * | 5/2007 | MacGregor | A01D 57/20 56/10.2 H |
| 2009/0007534 | A1 * | 1/2009 | Sauerwein | A01D 41/14 56/14.5 |
| 2009/0107094 | A1 * | 4/2009 | Bich | A01D 41/141 56/10.2 E |
| 2010/0011728 | A1 * | 1/2010 | Pietricola | A01D 57/04 56/14.4 |
| 2010/0018176 | A1 * | 1/2010 | Mortier | A01D 41/148 56/13.6 |
| 2011/0005184 | A1 * | 1/2011 | Conrad | A01D 41/148 56/181 |
| 2015/0195991 | A1 * | 7/2015 | Ricketts | A01D 41/141 56/249 |

FOREIGN PATENT DOCUMENTS

| | | |
|---|---|---|
| DE | 4432663 A1 | 3/1996 |
| EP | 0250649 A1 | 1/1988 |
| EP | 2436257 A1 | 4/2012 |
| EP | 2803257 A1 | 11/2014 |
| WO | 0219793 A1 | 3/2002 |
| WO | 2014023632 A1 | 2/2014 |

* cited by examiner

HEADER FOR A HARVESTING MACHINE INCLUDING A DISPLACEABLE CUTTERBAR TABLE

This application claims priority to Belgium Application BE2015/5125 filed Mar. 9, 2015, which is incorporated herein by reference in its entirety.

FIELD OF THE INVENTION

The present invention relates to harvesting machines, in particular to headers of such machines having a header frame and a cutterbar assembly, the cutterbar assembly being displaceable relative to the header frame to ensure a proper crop flow, by adjusting the distance between the cutterbar and an intake auger of the header.

BACKGROUND OF THE INVENTION

Harvesting machines such as combine harvesters are typically equipped with a header for cutting a crop such as grain and transporting the harvested crop towards a tank of the harvester.

In order to cut the crop, such a header may be equipped with a cutterbar comprising a plurality of knifes arranged adjacent each other in a direction substantially perpendicular to a traveling direction of the harvester.

The cut crop is subsequently received by an auger of the header (also referred to as an intake auger) which may transport the cut crop inwards to a central position where it is picked up by an elevator assembly or the like.

Typically, both the cutterbar and the intake auger are mounted to a frame of the header, whereby the cutterbar may be displaceably mounted. By doing so, the distance between the intake auger and the cutterbar can be adjusted. Such an adjustment may be advantageous to accommodate for different corp heights. To enable the adjustment, an actuator system, e.g. including hydraulic actuators, may be provided on the header.

On occasion, it may occur that harvested crop becomes stuck, e.g. between the auger and the frame of the header. In case of such occurance, it is important to remove such crop and to return to normal operating state.

SUMMARY OF THE INVENTION

It is an object of the present invention to provide in an effective manner of removing harvested crop that has become stuck in a header.

In order to realise an effective removal of such crop, the present invention provides, in a first aspect, in a header for a combine harvester, the header comprising:
  a frame;
  a cutterbar table that is movably mounted to the frame, the cutterbar table being configured to cut a standing crop;
  an intake auger mounted to the frame and configured to receive the cut crop; the intake auger further being configured to rotate, during a normal state, in a predetermined direction, and to rotate, during a corrective state, in a predetermined reversed direction;
  an actuator assembly configured to displace the cutterbar table relative to the frame, thereby changing a distance between the cutterbar table and the intake auger;
  a control unit for controlling the actuator assembly and the intake auger, the control unit being configured to, upon receipt of an error signal indicative of a need to operate in the corrective state:
    control the actuator assembly to displace the cutterbar table away from the intake auger to a safe operating position, prior to
    control the intake auger to rotate in the predetermined reversed direction.

In accordance with the first aspect of the invention, there is provided a header for a combine harverster, the header comprising a frame to which a cutterbar table and an intake auger are mounted. During normal operation of the combine harvester to which the header is mounted, the cutterbar table, cuts a standing crop, e.g. grain or canola. The cutterbar table is typically provided on the front side of the header. The cut crop is subsequently received by the intake auger which, in general, transports the cut crop to a central position of the header where the crop is passed on to an elevator or other transportation means, e.g. to transport the cut crop to an onboard tank of the harvester.

In order to accommodate for the harvesting of different types of crop, it may be advantageous to mount the cutterbar table to the frame of the harvester in a displaceable manner, thus allowing the distance between the cutterbar table and the intake auger to be adjusted.

In general, the most effective harvesting is obtained when the crop that is cut falls just in front of the intake auger. It should be avoided that the cut crop falls on top of the auger or falls too far away from the auger. As such, in order to accommodate for different crops, in particular crops having a different height, it may be required to adjust the distance between the cutterbar table and the intake auger. As an example, the cutterbar table may be brought comparatively close to the intake auger for harvesting small grain crops and may be brought comparatively remote from the intake auger for harvesting long-stemmed grains or canola.

As such, in order to accommodate for the harvesting of different-sized crops, the header according to the present invention comprises an actuator assembly for displacing the cutterbar table relative to the intake auger. In an embodiment, the actuator assembly may e.g. be configured to displace the cutterbar table in a substantially horizontal plane in a direction substantially parallel to a travelling direction of the harvester.

In accordance with the present invention, various types of actuators may be suited to perform the displacement of the cutterbar table. As an example, the actuator assembly may include one or more hydraulic, pneumatic or electromagnetic actuators.

The harvester according to the present invention further comprises a control unit to control the actuator assembly and the intake auger. Such a control unit can e.g. include one or more processors, microcontrollers or the like.

The control of an actuator assembly typically involves the generation of a control signal or command, by the control unit, which signal or command is provided to the actuator assembly in order for the actuator assembly to operate in a particular manner. As an example, the control signal may control a valve of an hydraulic actuator assembly or it may control a current or voltage source of an electromagnetic actuator assembly.

The control of the intake auger typically involves generating a command (e.g. based on an input signal provided by a user or a sensor) to a drive of the intake auger, to rotate the intake auger in a particular direction.

As such, by means of the generation of commands, the control unit of the header according to the present invention can control the rotational direction of the intake auger and the position of the cutterbar table, relative to the intake auger.

In accordance with the first aspect of the present invention, the intake auger of the header is configured to rotate, when in a normal state, in a predetermined direction, and to rotate, when in a corrective state, in a predetermined reversed direction. Within the meaning of the present invention, normal state may e.g. refer to an operating state whereby a standing crop is cut by the cutterbar and the cut crop is transported by the intake auger to a central position of the header, by rotating the auger in a predetermined direction.

A corrective state may, within the meaning of the present invention, e.g. refer to a state whereby harvested or cut crop has become stuck, e.g. between the frame and the intake auger or elsewhere along the transportation trajectory of the harvested crop and whereby a rotational direction of the intake auger needs to be reversed in order to remove the crop that has become stuck.

It has been devised by the inventors that when the rotational direction of the intake auger is reversed, there is a risk of damaging the cutterbar table and/or the intake auger, when both are comparatively close, i.e. when both are in a position to harvest comparatively small grains.

In order to avoid such damage to either the cutterbar table or the intake auger, the control unit of the header according to the invention is configured to, upon receipt of an error signal indicative of a need to operate in the corrective state:
  control the actuator assembly to displace the cutterbar table away from the intake auger to a safe operating position, prior to
  control the intake auger to rotate in the predetermined reversed direction.

As such, in accordance with the present invention, a command to reverse the direction of rotation of the intake auger is only released when the cutterbar table is in a safe operating position. In accordance with the present invention, a safe operating position is defined as a relative position of the intake auger and the cutterbar table wherein a deformation or an upward displacement of the cutterbar table, would not cause the cutterbar table to invade an operating area of the intake auger. Such a deformation or upward movement of the cutterbar table could e.g. occur when harvested crop becomes stuck between the frame and the cutterbar table. It has been observed that, when the intake auger is rotating in the reverse direction, harvested crop may pile up in between the frame and the cutterbar table, the piled up crop pushing the cutterbar table upward. If this occurs when the cutterbar table is close to the intake auger, the cutterbar table may enter the operating area of the intake auger, i.e. the area or volume which is occupied by the auger during operation. When the cutterbar table enters or invades the operating area of the intake auger, either one of them or both may be damaged. By positioning the cutterbar table in a safe operating position, i.e. sufficiently remote from the intake auger, prior to the reversal or the rotational direction of the intake auger, damage to either the intake auger, the cutterbar table or both can be avoided.

In an embodiment, the control of the actuator assembly to displace the cutterbar table to the safe operating position may e.g. be based on a position signal that is provided by a position sensor to the control unit. The position signal may e.g. represent a position of the cutterbar table relative to the intake auger.

In an embodiment, the control unit may be configured to control the actuator assembly to displace the cutterbar table to the most remote position, i.e. to the position wherein the cutterbar table and the intake auger are the furthest away from each other, when the error signal is received. In such case, no position signal may be required.

In accordance with the present invention, the control unit is configured to receive an error signal indicative of a need to operate in the corrective state. Such a signal can e.g. be a signal provided by a user, e.g. the driver of the harvester or a signal generated by a sensor, e.g. an error sensor configured to detect a blockage of harvested crop along the transportation trajectory of the crop.

In an embodiment, a user interface may be provided, e.g. located in the cabin of the harvester, that enables a user to provide the error signal indicating the need to go to the corrective state.

In an embodiment, the error signal, indicative of the need to operate in the corrective state, may be a camera image provided to the cabin or may be the result of an actual sensing of a property such as a pressure or electrical resistance (indicative of the density of a flow of crop) by a sensor.

In a second aspect of the present invention, there is provided a method of operating a combine harvester, the method comprising the steps of:
  when operating in a normal state:
    cutting a standing crop by means of a cutterbar table;
    providing the cut crop to an intake auger rotating in a predetermined direction;
    receiving an error signal indicating of a need to operate in a corrective state; and,
  when operating in a corrective state:
    displacing the cutterbar table away from the intake auger to a safe operating position and
    rotating the intake auger in a predetermined reverse direction,
  wherein the step of displacing the cutterbar table away from the intake auger is performed prior to the step of rotating the intake auger in a predetermined reverse direction.

In a third aspect of the present invention, there is provided a computer program product comprising computer readable instructions which, when executed by a control unit of a header of a combine harvester, enable the control unit to perform the steps of:
  controlling the header to operate in a normal state, thereby
  controlling a cutterbar table to cut a standing crop;
  controlling an intake auger of the header to rotate in a predetermined direction;
  receiving an error signal indicating a need to operate in a corrective state;
  controlling the header to operate in a corrective state, thereby
  controlling the cutterbar table to displace away from the intake auger to a safe operating position and
  controlling the intake auger to rotate in a predetermined reverse direction, wherein the step of controlling the cutterbar table to displace away from the intake auger to a safe operating position is performed prior to the step of controlling the intake auger to rotate in a predetermined reverse direction.

BRIEF DESCRIPTION OF THE DRAWINGS

FIG. 2(b) depicts a second cross-sectional view of a header according to the present invention at a second cutterbar table position;

DETAILED DESCRIPTION OF EMBODIMENTS

Figure 1:
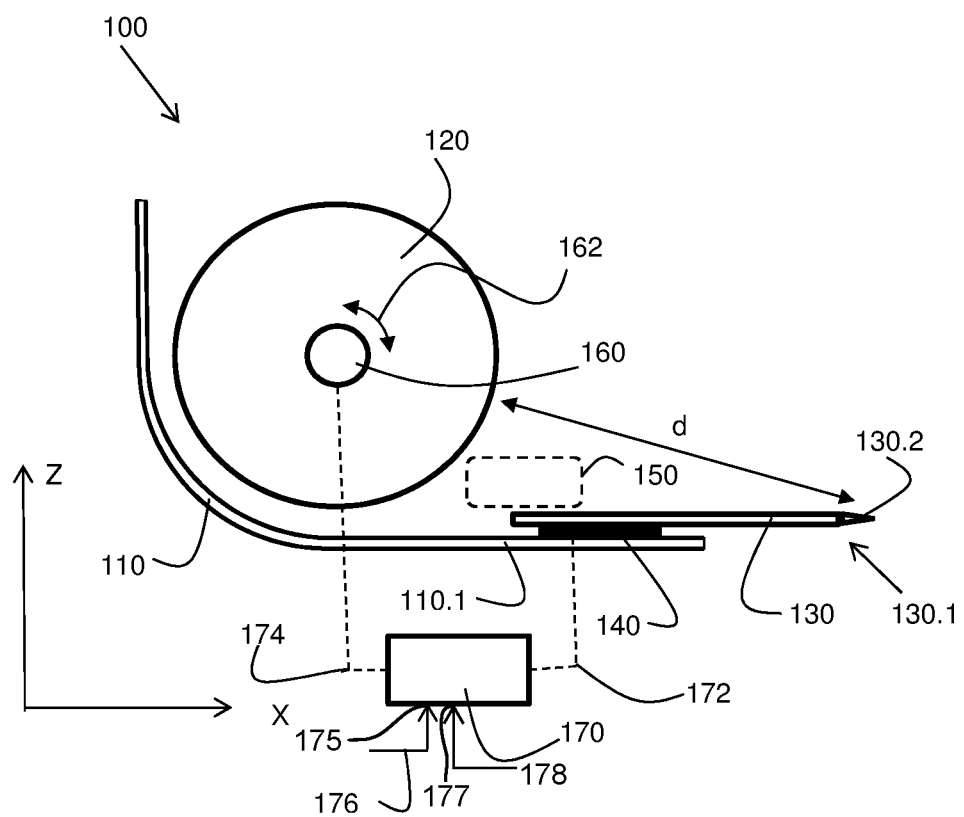
FIG. 1 depicts a cross-sectional view of a header according to the present invention.

FIG. 1 schematically depicts a cross-sectional view of an embodiment of a header according to the present invention.

As shown, the header 100 comprises a frame 110, an intake auger 120 and a cutterbar table 130. The cutterbar table 130 is movably or displaceably mounted to the frame 100. In the embodiment as shown, the cutterbar table 130 is mounted above a bottom portion 110.1 of the frame 100. On the frontside 130.1, front referring to the frontside when the header 100 is mounted to an harvester, the cutterbar table 130 is provided with an array of cutting tools 130.2 to cut a standing crop during operation.

Figure 2:
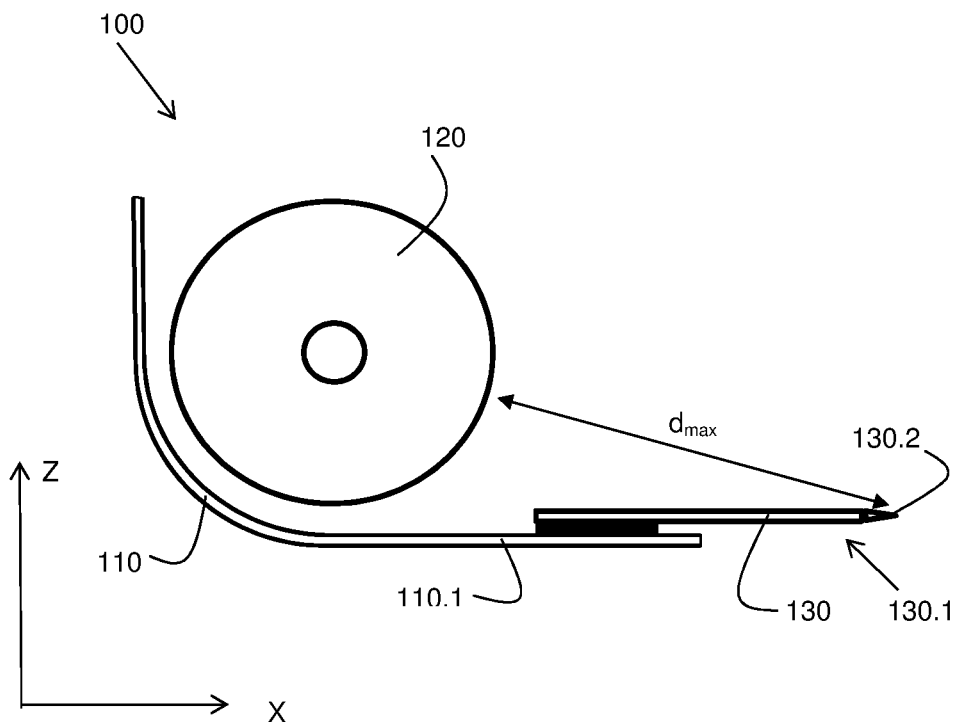
FIG. 2(*a*) depicts a first cross-sectional view of a header according to the present invention at a first cutterbar table position.
Figure 2:
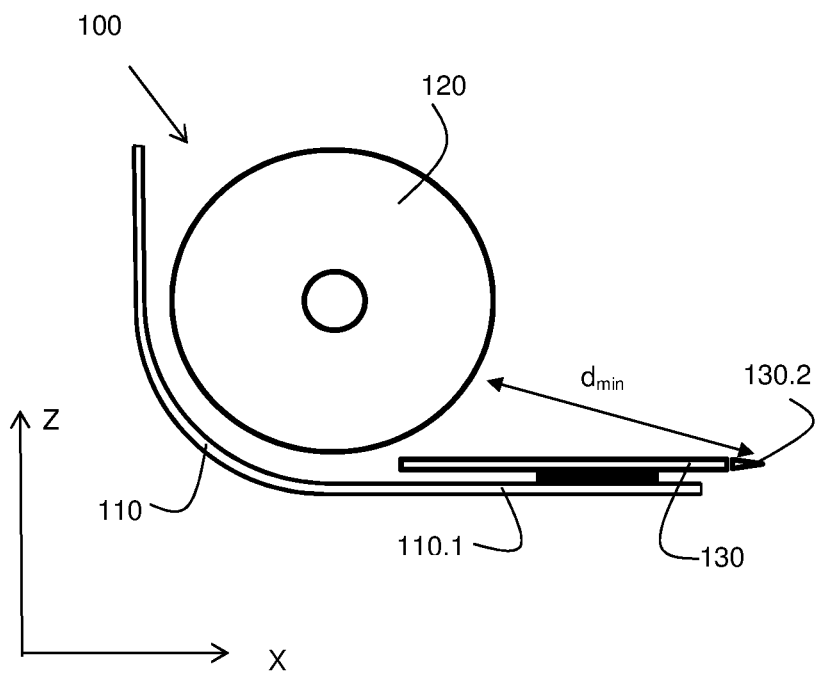

The embodiment as shown further comprises an actuator assembly 140 configured to displace the cutterbar table 130 relative to the frame 110, thereby changing a distance between the cutterbar table 130 and the intake auger 120. By doing so, a distance d between the cutting tools 130.2 and the intake auger 120 is made adjustable. Adjusting said distance d enable a more effective harvesting of various types of crops. In general, the most effective harvesting is obtained when the crop that is cut (by means of the cutting tools 130.2) just in front of the intake auger (indicated by the dotted area 150). It should be avoided that the cut crop falls on top of the intake auger or falls too far away from the auger. As such, in order to accommodate for different crops, in particular crops having a different height, it may be required to adjust the distance between the cutterbar table 130 and the intake auger 120. FIGS. 2(a) and 2(b) schematically shows the header according to FIG. 1 in two extreme positions for the distance d between the intake auger 120 and the cutterbar table 130, in particular the cutting tools 130.2 of the cutterbar table. In FIG. 2(b), the cutterbar table 130 is brought comparatively close to the intake auger 120 resulting in a minimal distance dmin between the cutting tools 130.2 and the intake auger 120. This may be a suitable position for harvesting small grain crops. In FIG. 2(a), the cutterbar table 130 is brought comparatively remote from the intake auger 120 resulting in a maximum distance dmax between the cutting tools 130.2 and the intake auger 120. This may be suitable position for harvesting long-stemmed grains or canola. Typically, a relative displacement of the cutterbar table and the bottom portion 110.1 along the horizontal direction (X-direction) in a range of 40 cm-70 cm may be sufficient to accommodate the harvesting of various types of crops.

FIG. 1 further schematically shows a drive 160 of the intake auger 120, the drive 160 being configured to rotate the intake about an axis perpendicular to the shown XZ-plane, i.e. in a direction as indicated by the arrow 162. During normal operation of the combine harvester to which the header is mounted, the cutterbar table, which is located on the front side of the header, cuts a standing crop, e.g. grain or canola. The cut crop is subsequently received by the intake auger which, in general, transports the cut crop to a central position of the header where the crop is passed on to an elevator or other transportation means, e.g. to transport the cut crop to an onboard tank of the harvester. In order to transport the crop to the central position, the intake auger 120 needs to rotate in a predetermined direction, e.g. clockwise. The operating state whereby the crop is transported to the central position, is considered, within the meaning of the present invention, as the normal state of operation. When the intake auger would rotate in a reverse direction, e.g. counter-clockwise, the cut crop would not be picked up an transported to the central position. Such a rotation of the intake auger in a reverse direction may be required in case cut crop got stuck in between the auger and the frame or elsewhere along the transportation trajectory of the cut crop. By reversing the rotational direction of the intake auger, the crop that got stuck may be released. As such, the operating state whereby the intake auger is rotated in the reverse direction (reversed compared to the rotational direction in the normal state), is refered to in the present invention as the corrective state.

FIG. 1 further schematically depicts a control unit 170 for controlling the actuator assembly 140 and the intake auger 120. By means of an actuator control signal 172 and an auger control signal 174, the actuator assembly 140 and the drive 160 of the intake auger 120 can be controlled. In an embodiment, the control unit 170 may comprise one or more output terminals for outputting the control signals 172 and 174.

In accordance with the present invention, the control unit 170 is configured to receive an error signal 176 indicative of a need to operate in the corrective state. Such a signal can e.g. be a signal provided by a user, e.g. the driver of the harvester or a signal generated by a sensor, e.g. an error sensor configured to detect a blockage of harvested crop along the transportation trajectory of the crop.

In an embodiment, a user interface may be provided, e.g. located in the cabin of the harvester, that enables a user to provide the error signal 176 indicating the need to go to the corrective state.

In an embodiment, the error signal 176, indicative of the need to operate in the corrective state, may be a camera image provided to the cabin or may be the result of an actual sensing of a property such as a pressure or electrical resistance (indicative of the density of a flow of crop) by a sensor.

The control unit 170 as applied in the present invention is further configured to, upon receipt of an error signal indicative of a need to operate in the corrective state:
  control the actuator assembly to displace the cutterbar table away from the intake auger to a safe operating position, prior to
  control the intake auger to rotate in the predetermined reversed direction.

In accordance with the present invention, a particular procedure is proposed in case an error signal 176 is received. Rather than merely reversing the rotational direction when an error signal is received or when a driver of the harvester observes that a reversed rotation is required (e.g. to remove harvested crop that got stuck), the present invention proposes to displace the cutterbar table away from the intake auger to a safe operating position, prior to controlling the intake auger to rotate in the reversed direction.

Figure 3:
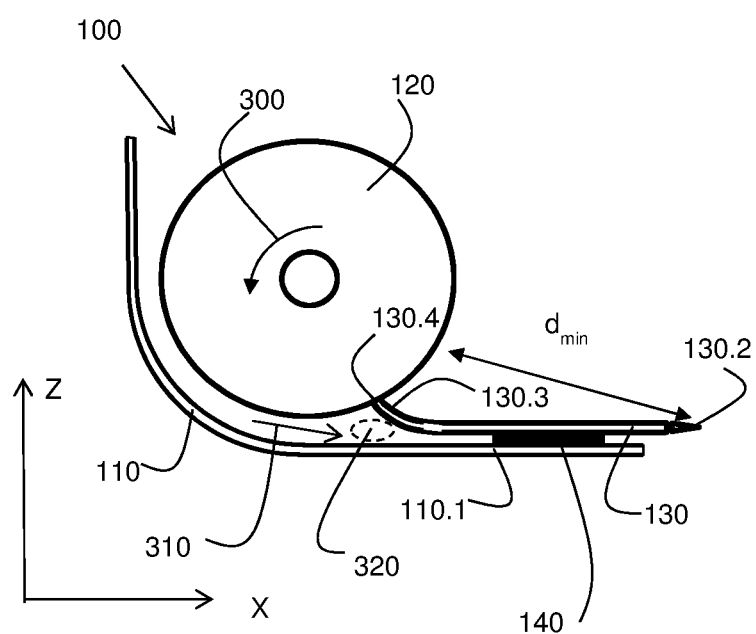
FIG. 3 depicts a cross-sectional view of a header according to the present invention whereby the cutterbar table is in a position potentially causing damage.

By doing so, damage to either the intake auger or the cutterbar table or both can be avoided. This is schematically illustrated in FIG. 3. FIG. 3 schematically illustrates a possible scenario in case the intake auger 120 rotates in a reverse direction when the cutterbar table 130 is close to the intake auger 120, similar to the positions as depicted in FIG.

2(b). In such a situation, the rotation of the intake auger 120 in the reverse direction (indicated by the arrow 300) may result in cut crop being transported from the intake auger 120 towards the cutterbar table 130 (instead of the normal flow direction from the cutterbar table 130 towards the intake auger 120), as indicated by the arrow 310. As a result, cut crop may pile up in the area between the frame 110 and the cutterbar table 130, in particular between the bottom part 110.1 of the frame 110 and a rear end portion 130.3 of the cutterbar table 130, this area schematically being indicated by the dotted line 320. As a result, the piled up crop may push the cutterbar table upwards or deform it. As a result, due to the comparatively small distance between the intake auger and the cutterbar table (illustrated by the distance dmin), a back edge 130.4 of the cutterbar table 130 may contact the intake auger 120, i.e. the back part of the cutterbar table may enter the operating area of the intake auger 120, the operating area or volume being the envelope of the volume occupied by the intake auger during operation. When this occurs, either the intake auger or the cutterbar table may become damaged. In order to avoid such damage, the present invention proposes to control the actuator assembly 140 to displace the cutterbar table 130 away from the intake auger 120 to a safe operating position, prior to controlling the intake auger 120 to rotate in the predetermined reversed direction.

Figure 4:
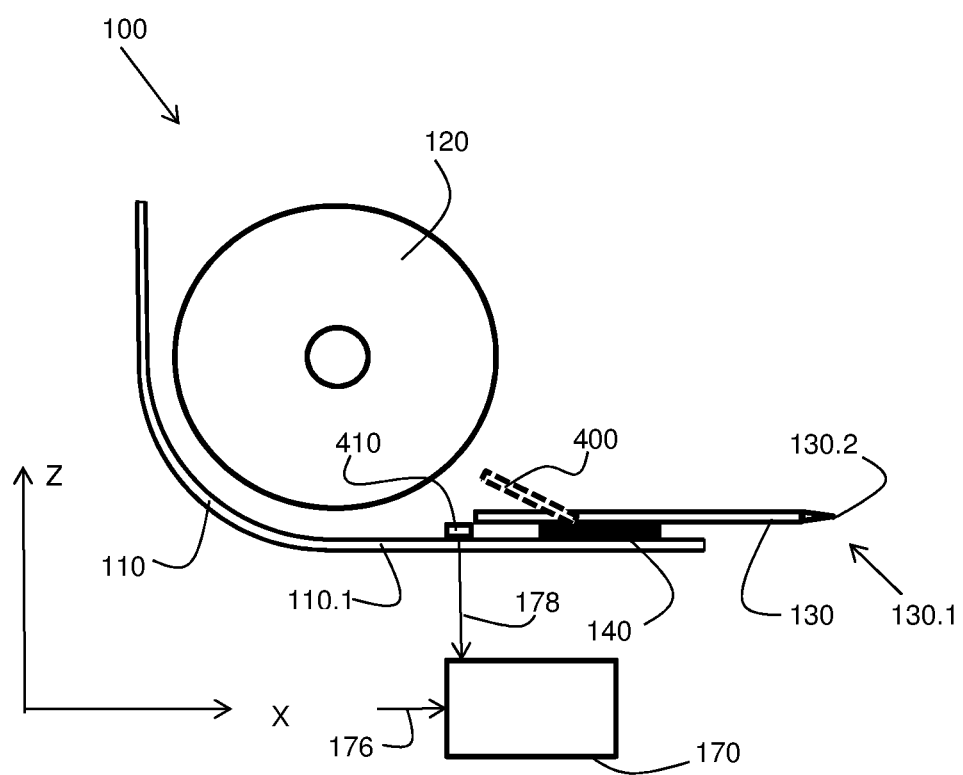
FIG. 4 depicts a cross-sectional view of a header according to the present invention, whereby the cutterbar table is in a safe operating position.

Within the meaning of the present invention, "safe operating position" is used to denote a position of the cutterbar table relative to the intake auger which is sufficiently large to avoid, when the cutterbar table would be moved upward or would deform, that the cutterbar table can come in contact with the intake auger. In FIG. 4, the cutterbar table 130 is shown in such a safe operating position. Compared to the position as shown in FIG. 3, the cutterbar table 130 is in a more forward position, i.e. further away from the intake auger 120. In the position as depicted, a possible deformation or raising of the back portion of the cutterbar table (the deformed or raised back portion being indicated by the dotted line 400) would not result in the contacting of the intake auger 120 by the cutterbar table, the depicted position thus constitution a safe operating position.

In an embodiment, the control of the actuator assembly 140 to displace the cutterbar table 130 to the safe operating position may e.g. be based on a position signal 178 that is provided by a position sensor 410 to the control unit 170. The position signal 178 may e.g. represent a position of the cutterbar table 130 relative to the intake auger 120. In the embodiment as shown, the position sensor is mounted to the bottom portion 110.1 of the frame 110 to which the cutterbar table 130 is movably mounted. Such a sensor may e.g. be a capacitive or inductive sensor, or may be an actual position measurement system such as an incremental encoder measurement system or the like.

In an embodiment, the control unit 170 may comprise one or more input terminals 177, 175, e.g. to receive a sensor signal 178 or an error signal (signal 176 in FIG. 1 or FIG. 4) and one or more output terminals to output one or more control signals such as control signals 172 and 174 as shown in FIG. 1.

In an embodiment, the control unit 170 may be configured to control the actuator assembly 140 to displace the cutterbar table 130 to the most remote position, i.e. to the position wherein the cutterbar table and the intake auger are the furthest away from each other, when the error signal (e.g. signal 176 as shown in FIG. 1 or FIG. 4) is received. In such case, no position signal may be required. Such a most remote position may e.g. correspond to the relative position as depicted in FIG. 2(b).

In accordance with the present invention, the control unit 170 is configured to receive an error signal 176 indicative of a need to operate in the corrective state. Such a signal can e.g. be a signal provided by a user, e.g. the driver of the harvester or a signal generated by a sensor, e.g. an error sensor configured to detect a blockage of harvested crop along the transportation trajectory of the crop.

In an embodiment, a user interface may be provided, e.g. located in the cabin of the harvester, that enables a user to provide the error signal 176 indicating the need to go to the corrective state.

In an embodiment, the error signal 176, indicative of the need to operate in the corrective state, may be a camera image provided to the cabin or may be the result of an actual sensing of a property such as a pressure or electrical resistance (indicative of the density of a flow of crop) by a sensor.

Figure 5:
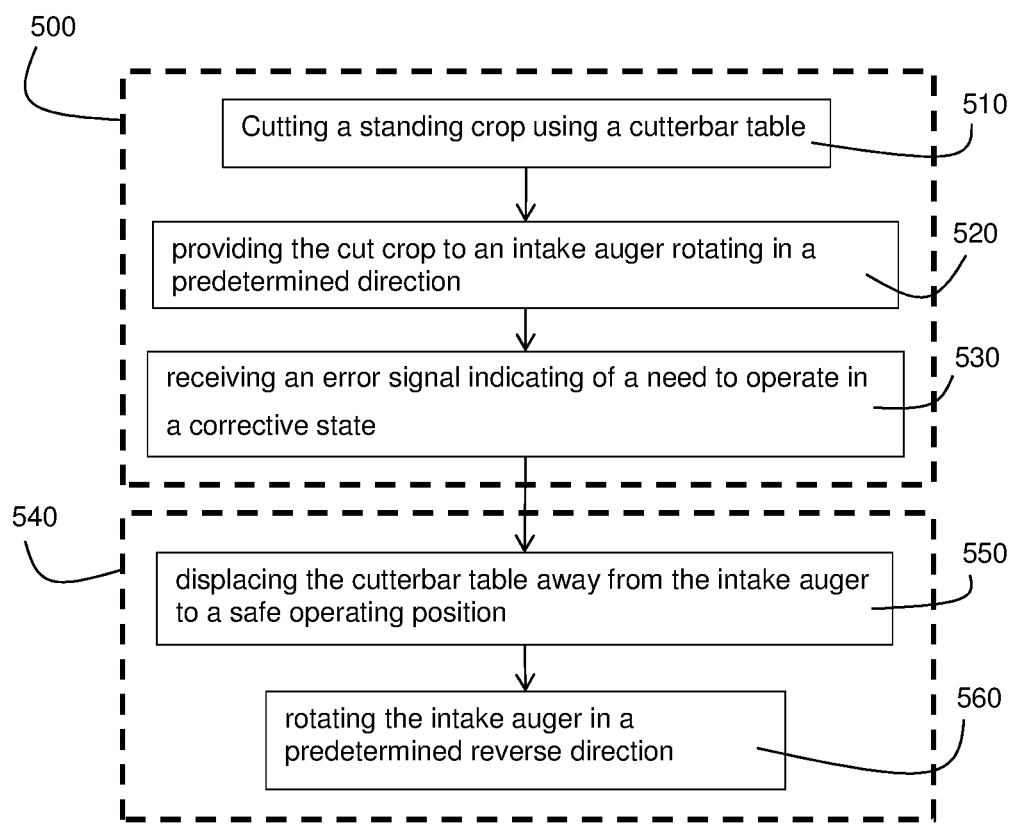
FIG. 5 schematically shows a flow-cart of a method according to the present invention.

The present invention may further be embodied in a method of operating a combine harvester. FIG. 5 schematically shows a flow-chart of an embodiment of the method according to the present invention.

The method according to the present invention comprises the steps of when operating in a normal state (500):
cutting a standing crop by means of a cutterbar table (510);
providing the cut crop to an intake auger rotating in a predetermined direction (520);
receiving an error signal indicating of a need to operate in a corrective state (530); and, when operating in a corrective state (540):
displacing the cutterbar table away from the intake auger to a safe operating position (550) and
rotating the intake auger in a predetermined reverse direction (560).

In accordance with the present invention, the step of displacing the cutterbar table away from the intake auger (550) is performed prior to the step of rotating the intake auger in a predetermined reverse direction (560).

The present invention may further be embodied as a computer program product. Such computer program product may e.g. include a data carrier or storage medium onto which a set of computer readable instructions are stored. In accordance with the present invention, these instructions may be executed by a control unit of a header of a combine harvester, and enable the control unit to perform the steps of:
controlling the header to operate in a normal state, thereby controlling a cutterbar table to cut a standing crop;
controlling an intake auger of the header to rotate in a predetermined direction;
receiving an error signal indicating a need to operate in a corrective state;
controlling the header to operate in a corrective state, thereby
controlling the cutterbar table to displace away from the intake auger to a safe operating position and
controlling the intake auger to rotate in a predetermined reverse direction,
wherein the step of controlling the cutterbar table to displace away from the intake auger to a safe operating position is performed prior to the step of controlling the intake auger to rotate in a predetermined reverse direction.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In this respect, it should be noted that the cited dimensions are only indicative for good understanding and are not restricted to the scope of the invention.

Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A header for a harvester, the header comprising;
    a frame;
    a cutterbar table movably mounted to the frame, the cutterbar table positioned to cut a standing crop;
    an intake auger mounted to the frame and positioned to receive the cut crop; the intake auger further journaled to rotate during a normal state in a predetermined direction, and to rotate during a corrective state in a predetermined reversed direction;
    a drive for said intake auger to rotate it selectively in said predetermined direction and said reverse direction;
    an actuator assembly connected to displace the cutterbar table relative to the frame, thereby changing a distance between the cutterbar table and the intake auger;
        a control unit for controlling the actuator assembly and the intake auger drive, the control unit programmed for, upon receipt of an error signal indicative of a need to operate in the corrective state:
        controlling the actuator assembly to displace the cutterbar table away from the intake auger to a safe operating position, prior to controlling the intake auger drive to rotate said intake auger in the predetermined reversed direction.

2. The header according to claim 1, wherein the cutterbar table is movably mounted above a bottom portion of the frame.

3. The header according to claim 1, wherein the actuator assembly is configured to displace the cutterbar table in a substantially horizontal plane in a direction substantially parallel to a travelling direction of the harvester.

4. The header according to claim 1, wherein the control unit comprises an input terminal for receiving the error signal.

5. The header according to claim 3, wherein the control unit is further configured to:
    receive, at the input terminal, a position signal representative of a position of the cutterbar table, and
    control the actuator assembly based on the position signal.

6. The header according to claim 1, wherein the actuator assembly comprises one or more hydraulic, pneumatic or electromagnetic actuators for displacing the cutterbar table.

7. The header according to claim 1, wherein the control unit comprises an output terminal for outputting an actuator control signal for controlling the actuator assembly and an auger control signal for controlling the intake auger.

8. The header according to claim 1, in combination with a combine harvester wherein the header is mounted to a feeder of the combine harvester.

9. Method of operating a combine harvester, the method comprising the steps of:
    when operating in a normal state:
        cutting a standing crop with a cutterbar table;
        providing the cut crop to an intake auger rotating in a predetermined direction;
        receiving with a control unit an error signal indicating of a need to operate in a corrective state; and,
    when operating in a corrective state:
        displacing the cutterbar table away from the intake auger to a safe operating position by using the control unit and an associated actuator and
        rotating the intake auger in a predetermined reverse direction,
    wherein the step of displacing the cutterbar table away from the intake auger is performed prior to the step of rotating the intake auger in a predetermined reverse direction.

* * * * *